(12) United States Patent
Hosoda

(10) Patent No.: US 11,260,713 B2
(45) Date of Patent: Mar. 1, 2022

(54) BUSH

(71) Applicant: BRIDGESTONE CORPORATION, Chuo-ku Tokyo (JP)

(72) Inventor: Masaki Hosoda, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 57 days.

(21) Appl. No.: 16/636,905

(22) PCT Filed: Aug. 29, 2018

(86) PCT No.: PCT/JP2018/031982
§ 371 (c)(1),
(2) Date: Feb. 6, 2020

(87) PCT Pub. No.: WO2019/049752
PCT Pub. Date: Mar. 14, 2019

(65) Prior Publication Data
US 2020/0207170 A1 Jul. 2, 2020

(30) Foreign Application Priority Data
Sep. 5, 2017 (JP) .............................. JP2017-170619

(51) Int. Cl.
*B60G 7/00* (2006.01)
*F16F 1/387* (2006.01)
*F16F 15/08* (2006.01)

(52) U.S. Cl.
CPC ............ *B60G 7/008* (2013.01); *F16F 1/3873* (2013.01); *F16F 15/08* (2013.01); *B60G 2204/143* (2013.01); *B60G 2204/4104* (2013.01)

(58) Field of Classification Search
CPC ........ F16F 15/08; F16F 1/3828; F16F 1/3873; B60G 21/052; B60G 7/008;
(Continued)

(56) References Cited

U.S. PATENT DOCUMENTS 3,244,386 A 4/1966 Bourgeois
3,850,418 A 11/1974 Hipsher et al.
(Continued)

FOREIGN PATENT DOCUMENTS

CN 1735759 A 2/2006
CN 105074261 A 11/2015
(Continued)

OTHER PUBLICATIONS

Mar. 10, 2020, International Preliminary Report on Patentability issued in the International Patent Application No. PCT/JP2018/031982.
(Continued)

*Primary Examiner* — Robert A. Siconolfi
*Assistant Examiner* — San M Aung
(74) *Attorney, Agent, or Firm* — Kenja IP Law PC

(57) ABSTRACT

A bush including an inner cylinder, an outer cylinder arranged radially outside the inner cylinder, and an elastic body connecting the inner cylinder and the outer cylinder, where a rubber portion 13 is provided with a bore (low-rigidity portion) 14 that extends a predetermined length in a circumferential direction and lowers rigidity in a radial direction, a convex portion 11a that projects from the inner cylinder 11 to the outer cylinder 12 is provided at a circumferential position corresponding to the bore 14 of the inner cylinder 11, and the convex portion 11a is arranged to be shifted to one side in the circumferential direction with respect to a circumferential center of the bore 14.

12 Claims, 4 Drawing Sheets

(58) Field of Classification Search
CPC ........ B60G 2204/41; B60G 2204/4104; B60G 2204/143; B60G 2204/1434
USPC .......................................................... 267/292
See application file for complete search history.

(56) References Cited

U.S. PATENT DOCUMENTS

| | | | |
|---|---|---|---|
| 4,334,698 A | 6/1982 | Ruf | |
| 6,585,222 B2* | 7/2003 | Ihara | F16F 1/3873 248/308 |
| 2002/0063196 A1* | 5/2002 | Ihara | F16F 1/3873 248/608 |
| 2004/0113337 A1* | 6/2004 | Landry, Jr. | F16F 1/3873 267/141 |
| 2004/0251585 A1 | 12/2004 | Power et al. | |
| 2012/0112395 A1* | 5/2012 | Mizobe | F16F 1/3828 267/139 |
| 2014/0124995 A1* | 5/2014 | Spielmann | F16F 1/3863 267/292 |
| 2014/0284858 A1 | 9/2014 | Sakata | |
| 2015/0367696 A1 | 12/2015 | Sugimoto | |
| 2017/0152908 A1* | 6/2017 | Yahata | B60G 21/052 |
| 2019/0054786 A1* | 2/2019 | Hester | B60G 3/145 |

FOREIGN PATENT DOCUMENTS

| | | |
|---|---|---|
| FR | 2453036 A1 | 10/1980 |
| GN | 104061265 A | 9/2014 |
| JP | H0774658 B2 | 8/1995 |
| JP | 2003205720 A | 7/2003 |
| JP | 2008163986 A | 7/2008 |
| JP | 2016109159 A | 6/2016 |

OTHER PUBLICATIONS

Jan. 11, 2021, search result of Office Action issued by the China National Intellectual Property Administration in the corresponding Chinese Patent Application No. 201880055866.9.
Oct. 23, 2018, International Search Report issued in the International Patent Application No. PCT/JP2018/031982.
Oct. 19, 2020, search result of the Extended European Search Report issued by the European Patent Office in the corresponding European Patent Application No. 18854023.1.

* cited by examiner

BUSH

TECHNICAL FIELD

This disclosure relates to a bush.

BACKGROUND

A torsion beam suspension used for rear wheels of a front-wheel drive vehicle is one type of automotive suspension, for example. The torsion beam suspension is in a structure where a trailing arm (trailing link) that supports each wheel on the left and right sides is connected by a torsion beam (torsion bar) arranged in the width direction of the vehicle, and an end of the trailing arm is integrally attached to a bush that is arranged obliquely to the front-rear direction of the vehicle.

A conventional bush structure is known to include an inner cylinder extending in the direction of the bush axis, an outer cylinder arranged radially outside the inner cylinder, and a main body rubber connecting the inner cylinder and the outer cylinder, where bores that penetrate the main body rubber in the direction of the bush axis are provided facing each other across the inner cylinder, and a convex portion that projects from the inner cylinder to the outer cylinder is provided at the center of the bore. Examples of the bush having such a bush structure include the one described in JP 2008-163986 A (PTL 1).

With the conventional bush structure, the relative relationship of the spring properties (spring property ratio) between a bore direction, which is a direction passing through the circumferential center of each of the oppositely arranged bores, and a solid direction, which is a direction passing through the circumferential center of each of the main body rubber portions that are oppositely arranged and sandwiched between the bores, is determined in the cross section of the bush. Therefore, the bush is generally arranged so that the front-rear direction of the vehicle, which has a heavy load on the bush, is substantially the solid direction. This is because that, in the solid direction, the spring property is hard and the displacement amount caused by input of load is small, so that the durability of the bush is maintained.

Under such circumstances, in order to improve the ride quality, for example, it may be desired to position the bush so that the front-rear direction of the vehicle, which has a heavy load on the bush, is moved to the bore direction side, for example, the front-rear direction of the vehicle is oriented substantially toward the center between the solid direction and the bore direction. As used herein, the bore direction refers to a direction that passes through a low-rigidity portion of an elastic body, where the elastic body is the main body rubber and the low-rigidity portion is formed by a space penetrating the main body rubber, and the solid direction refers to a direction that passes through a portion other than the low-rigidity portion of the elastic body, where the portion is formed by the main body rubber that is the elastic body.

CITATION LIST

Patent Literature

PTL 1: JP 2008-163986 A

SUMMARY

Technical Problem

However, for a bush where the bush axis is arranged obliquely to the front-rear direction of a vehicle, such as a torsion beam bush, the spring property is soft and the displacement amount caused by input of load is large in the bore direction in the case where the bush is positioned so that the front-rear direction of the vehicle is oriented substantially toward the center between the solid direction and the bore direction. This results in an increase in the displacement amount, that is, an increase in the pulling amount of the main body rubber portion, which makes it difficult to maintain the durability of the bush. Therefore, if it is attempted to maintain the durability of the bush while the bush is positioned so that the front-rear direction of the vehicle is oriented substantially toward the center between the solid direction and the bore direction, then the spring property ratio between the solid direction and the bore direction collapses.

As described above, for a torsion beam bush where the bush axis is arranged obliquely to the front-rear direction of a vehicle, it is difficult to maintain the durability of the torsion beam bush and keep the spring property ratio at the same time when the bore direction is tilted toward the side of the front-rear direction of the vehicle.

It could thus be helpful to provide a bush with which it is possible to maintain a predetermined spring property ratio between a low-rigidity portion and a portion other than the low-rigidity portion of an elastic body while maintaining the durability in the front-rear direction of a vehicle, in the state where the bush axis is arranged obliquely to the front-rear direction of the vehicle.

Solution to Problem

The bush of the present disclosure comprises an inner cylinder, an outer cylinder arranged radially outside the inner cylinder, and an elastic body connecting the inner cylinder and the outer cylinder, where the elastic body is provided with a low-rigidity portion that extends a predetermined length in a circumferential direction and lowers rigidity in a radial direction, a convex portion that projects from the inner cylinder to the outer cylinder is provided at a circumferential position corresponding to the low-rigidity portion of the inner cylinder, and the convex portion is arranged to be shifted to one side in the circumferential direction with respect to a circumferential center of the low-rigidity portion.

The bush arrangement structure of the present disclosure is a structure where the bush of the present disclosure is arranged so that a front-rear direction of a vehicle passes through the convex portion.

Advantageous Effect

According to the present disclosure, it is possible to provide a bush with which it is possible to maintain a predetermined spring property ratio between a low-rigidity portion and a portion other than the low-rigidity portion of an elastic body while maintaining the durability in the front-rear direction of a vehicle, in the state where the bush axis is arranged obliquely to the front-rear direction of the vehicle.

DETAILED DESCRIPTION

The following describes an embodiment of the present disclosure with reference to the drawings.

Figure 1:
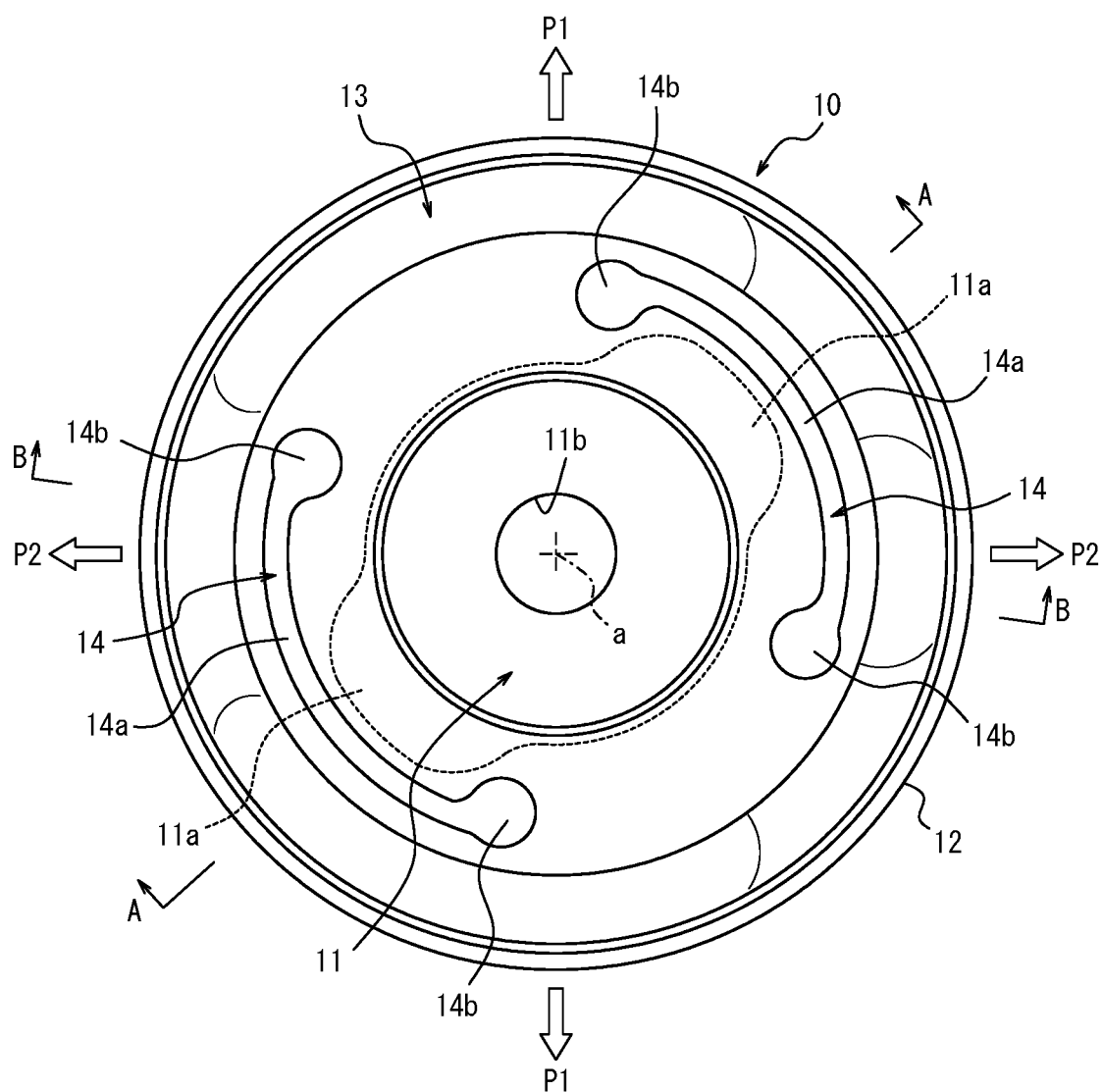
FIG. 1 is a plan view of an end face of a bush of an embodiment of the disclosure, which is orthogonal to the bush axis.

As illustrated in FIG. 1, the bush (torsion beam bush) 10 of the present embodiment includes an inner cylinder 11 extending in the direction of a bush axis a, an outer cylinder 12 arranged radially outside the inner cylinder 11, and a rubber portion 13, which is an elastic body, connecting the inner cylinder 11 and the outer cylinder 12, where the rubber portion 13 is provided with a bore 14 as a low-rigidity portion that extends a predetermined length in a circumferential direction and lowers rigidity in a radial direction, a convex portion 11a that projects from the inner cylinder 11 to the outer cylinder 12 is provided at a circumferential position corresponding to the bore 14 of the inner cylinder 11, and the convex portion 11a is arranged to be shifted to one side in the circumferential direction with respect to a circumferential center of the bore 14. In other words, the position of the circumferential center of the convex portion 11a is shifted from the position of the circumferential center of the low-rigidity portion. The position of the circumferential center of the bore 14, which is the low-rigidity portion, and the position of the circumferential center of the convex portion 11a are shifted in the circumferential direction in a range of −15° to 15° (excluding 0°).

Figure 2:
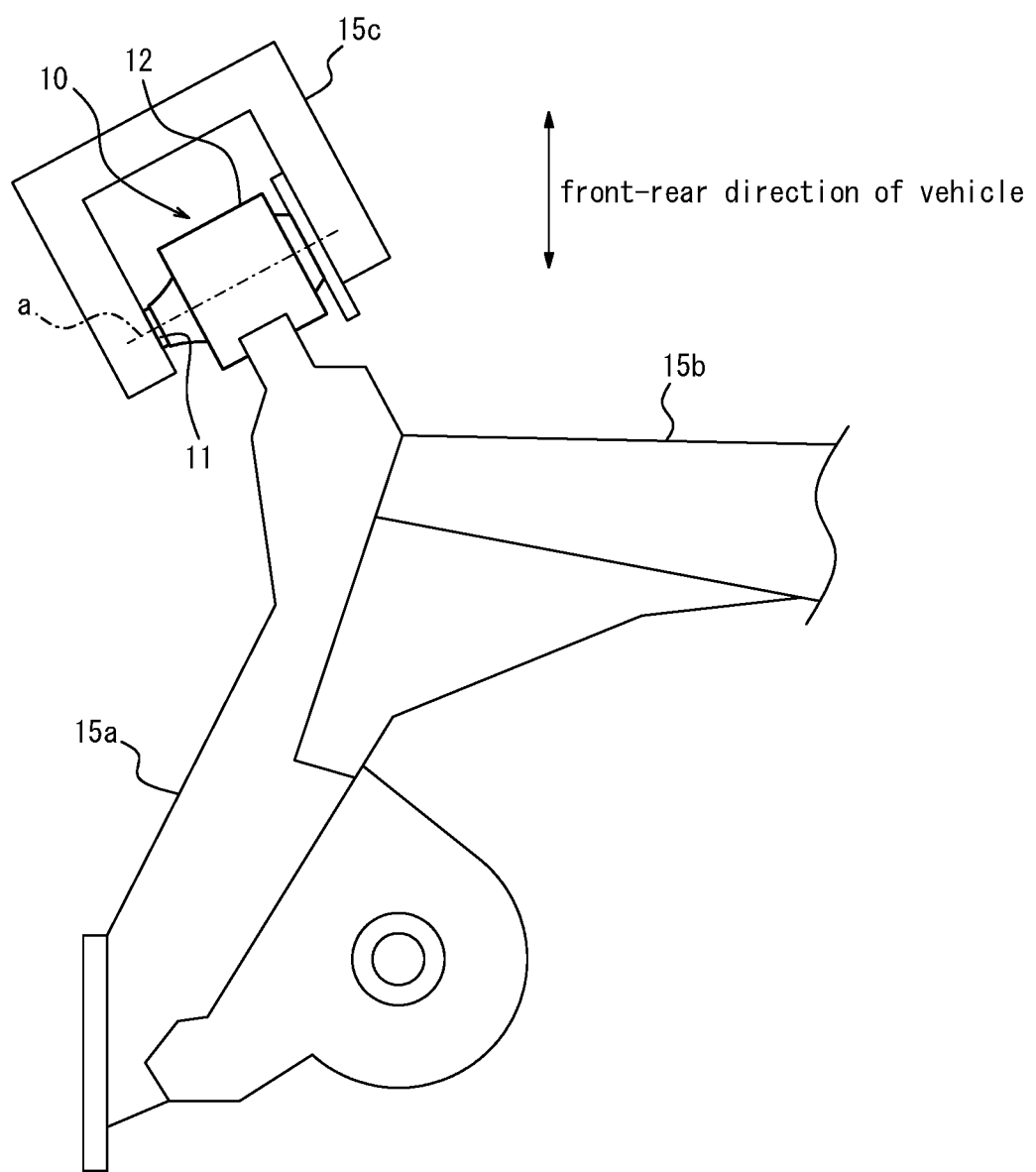
FIG. 2 schematically illustrates a part of a torsion beam suspension that can use the bush of FIG. 1.

As illustrated in FIG. 2, the bush 10 of the present embodiment is used in one type of automotive suspension, for example, a torsion beam suspension used in rear wheels of a front-wheel drive vehicle. In the torsion beam suspension, a trailing arm (trailing link) 15a that supports each wheel on the left and right sides (not illustrated in the figure) is connected by a torsion beam (torsion bar) 15b arranged in the width direction of the vehicle, and the trailing arm 15a is arranged on the vehicle body (not illustrated in the figure) with the bush axis a, which serves as a fulcrum of the trailing arm, being oblique to the front-rear direction of the vehicle. The bush 10 is mounted to an attaching member 15c fixed to the vehicle body. In the bush 10, an end of the trailing arm 15a integrated with the torsion beam 15b is, for example, integrally attached to the outer cylinder 12 of the bush 10 (see FIG. 2).

Figure 3:
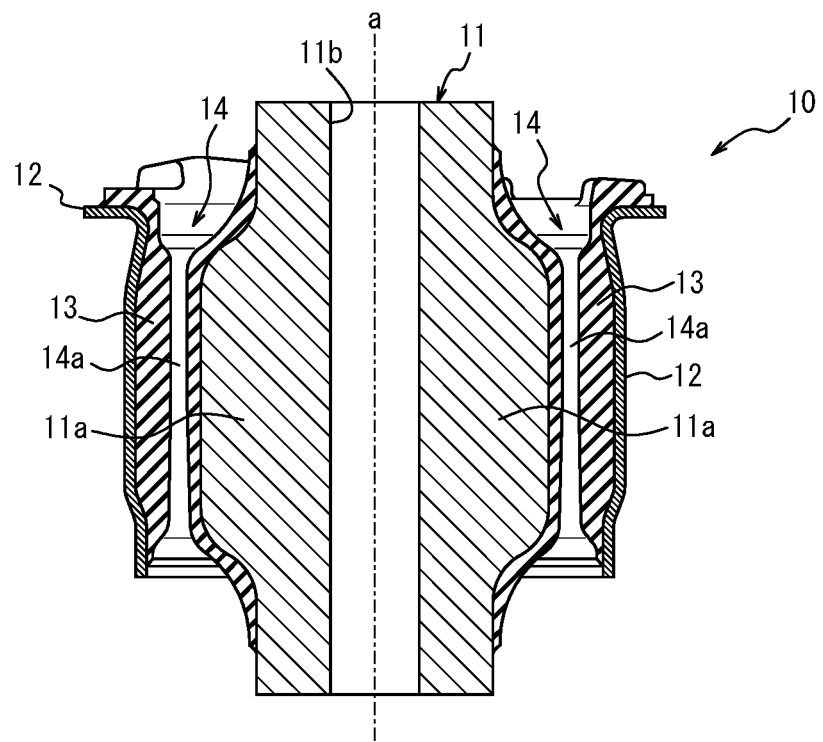
FIG. 3 is a cross-sectional view along the line A-A, illustrating the convex portion direction of the inner cylinder in the bush of FIG. 1.
Figure 4:
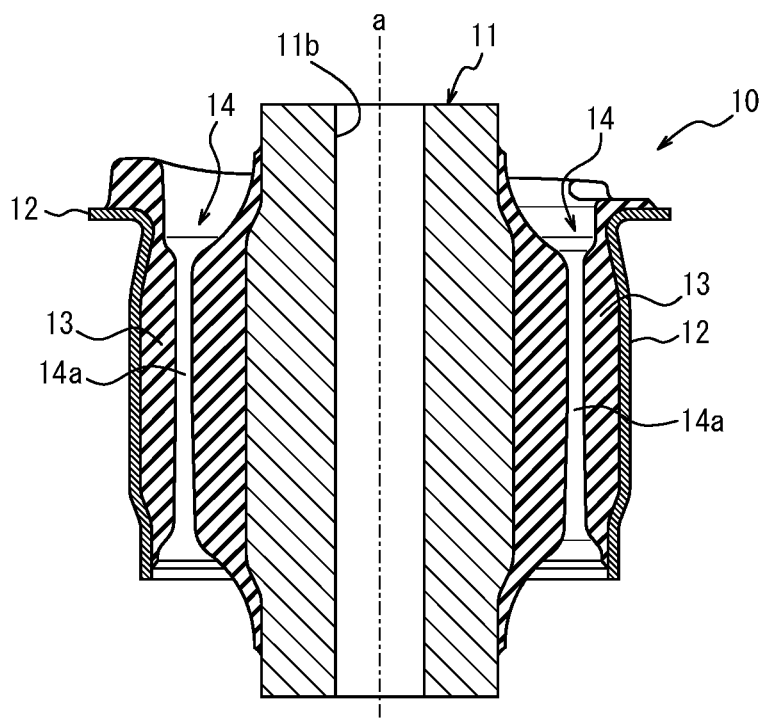
FIG. 4 is a cross-sectional view along the line B-B, illustrating the bore direction of the inner cylinder in the bush of FIG. 1.

In the present embodiment, the inner cylinder 11 is formed in a cylindrical shape having an axial space 11b that penetrates in the direction of the bush axis a, the outer cylinder 12 is formed in an annular shape, the inner cylinder 11 and the outer cylinder 12 are formed by, for example, metal members, the rubber portion 13 is formed in an annular shape that fills the space between the inner cylinder 11 and the outer cylinder 12, and the inner cylinder 11 and the outer cylinder 12 are arranged concentrically via the rubber portion 13, as illustrated in FIGS. 1, 3, and 4.

In the present embodiment, the bore 14 is formed as a through hole that penetrates the rubber portion 13 in the direction of the bush axis a (see FIGS. 1, 3, and 4). In addition, the bore 14 is formed over a range (arc range) having a central angle of 60° or more about the axis of the inner cylinder 11 (bush axis a) in the circumferential direction of the rubber portion 13. For example, it is formed over a range (arc range) having a central angle of 60° or more and 150° or less and preferably 90° or more and 135° or less. Moreover, the bore 14 has a slit-shaped portion 14a extending in an arc shape along the circumferential direction and hole portions 14b at both ends in the circumferential direction (see FIG. 1). When the bore 14 is formed over a range having a central angle of 60° or more, the convex portion 11a can be freely arranged so that it is shifted from the slit-shaped portion 14a. Note that there is a part of the convex portion 11a on the radially inner side of the circumferential center of the bore 14 which is a low-rigidity portion. In other words, the convex portion 11a overlaps the circumferential center of the bore 14, which is a low-rigidity portion, in the circumferential direction.

In the present embodiment, a pair of bores 14 are provided at positions that are axially symmetric with respect to the bush axis a with the inner cylinder 11 interposed therebetween, as illustrated in FIG. 1. For example, in the diameter direction passing through the vicinity of two hole portions 14b and 14b, which is a solid direction P1 passing only through the rubber portion 13, the radial hardness of the bush 10 is higher than that in a bore direction P2 described later, leading to a hard portion. On the other hand, in the diameter direction passing through the two slit-shaped portions 14a and 14a, which is a bore direction P2 passing through the slit space, the radial hardness of the bush 10 is lower than that in the solid direction P1, leading to a soft portion.

In the present embodiment, the bore 14 is formed over a range having a central angle of 60° or more about the axis of the inner cylinder 11 (bush axis a) in the circumferential direction of the rubber portion 13, the pair of bores 14 and 14 are asymmetrically arranged with respect to both the axis of the solid direction P1 and the axis of the bore direction P2 (see FIG. 1), and any spring property ratio (rigidity ratio) can be set between the solid direction P1 and the bore direction P2. In addition, because the bore 14 of the present embodiment is formed over a range (arc range) of 150° or less, it is possible to guarantee the linearity of the spring property of the axis of the bore direction P2 for any displacement region.

As illustrated in FIG. 1, the convex portion 11a of the inner cylinder 11 of the present embodiment is formed as an irregularly shaped projection of the inner cylinder 11, where the projecting end is in the vicinity of the slit-shaped portion 14a, the entire width in a substantially radial direction of the rubber portion 13 corresponding to the slit-shaped portion 14a is set as the projection amount, and the projection range in the circumferential direction is shorter than the circumferential length of the slit-shaped portion 14a, for example. Because the circumferential length of the convex portion 11a is shorter than the circumferential length of the slit-shaped portion 14a, the convex portion 11a can be arranged between the solid direction P1 and the bore direction P2 on one side in the circumferential direction with respect to the circumferential center of the bore 14. For example, it can be arranged shifted to the solid direction P1 side, and only the rubber portion 13 with no convex portion 11a is in the bore direction P2.

With the above structure, the convex portion 11a of the inner cylinder 11 of the present embodiment, which is a projecting portion of the inner cylinder 11 formed of, for example, a metal member, reinforces the rubber portion 13 provided with the bore 14, thereby increasing the tensile strength in the direction of the two convex portions 11a and 11a (see FIG. 3). In addition, when the convex portion 11a is arranged shifted to the solid direction P1 side and does not extend to the bore direction P2, for example, only the rubber portion 13 with no convex portion 11a is in the bore direction P2 (see FIG. 4). As a result, even if a convex portion 11a is formed in the inner cylinder 11, the portion in the bore direction P2 is still a soft portion where the radial hardness of the bush 10 is low, thereby maintaining the softness.

In the present embodiment, the convex portion 11a is formed of a metal member, yet it is not limited to a metal member. For example, the convex portion 11a may be formed of a resin member and may be integrated with or separated from the inner cylinder 11.

In the present embodiment, the low-rigidity portion is the bore 14 formed by penetrating the rubber portion 13 in the direction of the bush axis a, yet it is not limited to this. For example, the low-rigidity portion may be formed as a non-penetrating thin portion extending over a certain range that does not penetrate the rubber portion 13 in the direction of the bush axis a. Note that a low-rigidity portion can be easily formed by choosing the bore 14.

In the present embodiment, the outer cylinder 12 may have an intermediate cylinder on the inner side, a rubber member may be provided between the inner cylinder 11 and the intermediate cylinder, and the intermediate cylinder may be press-fitted into the outer cylinder 12. The outer cylinder 12 and the intermediate cylinder may both be formed of a metal member, or at least one of them may be formed of a resin member.

Next, a bush arrangement structure will be described. The following describes the case where the bush 10 of the present embodiment is used in a torsion beam suspension (see FIG. 2), which is one type of automotive suspension. In other words, the following describes a bush arrangement structure in which the bush 10 of the present embodiment is arranged so that the front-rear direction of a vehicle passes through the convex portion 11a.

Figure 5:
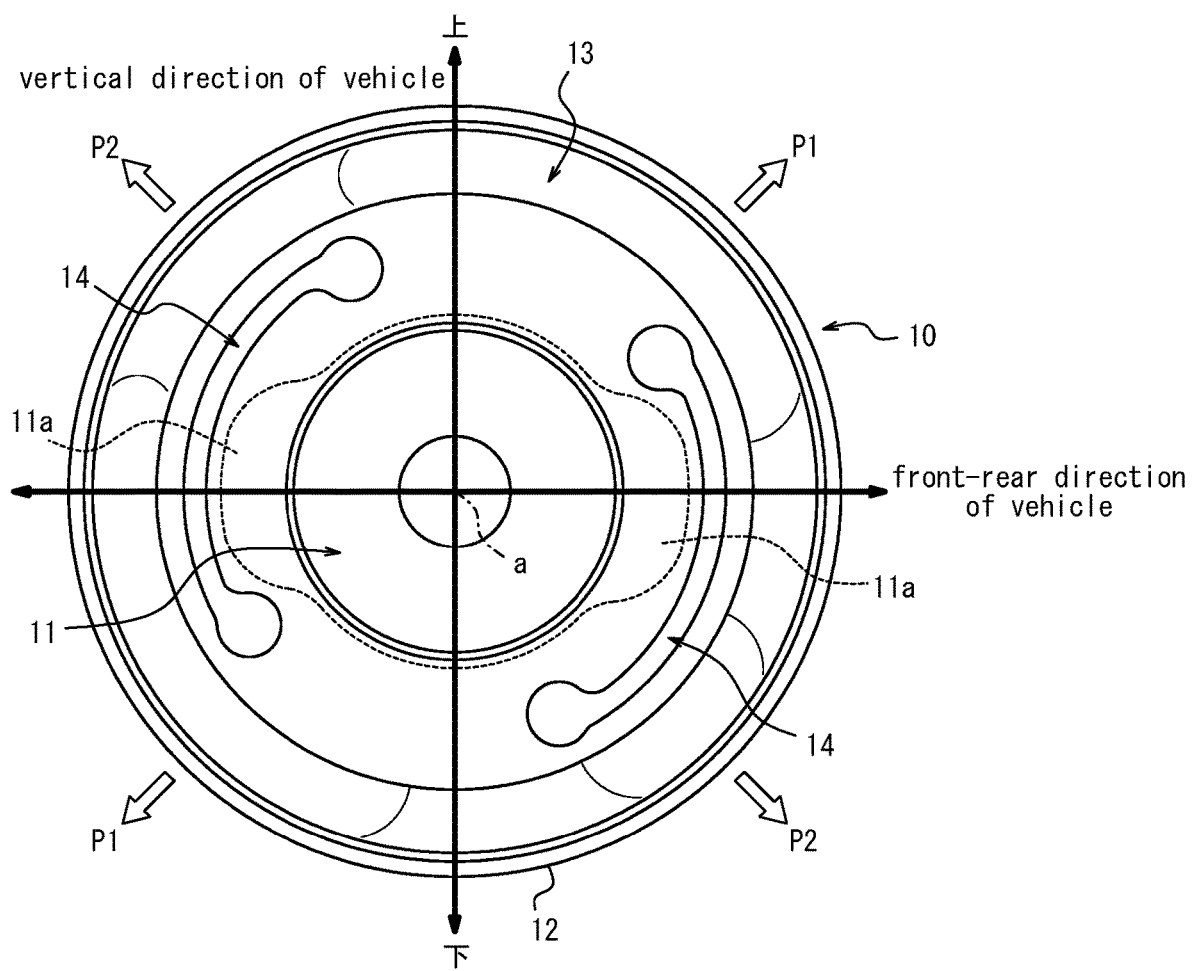
FIG. 5 is a plan view like FIG. 1, illustrating the state where the bush of FIG. 1 is mounted in a torsion beam suspension that can use the bush.

For the bush 10 of the present embodiment, the bush axis a is arranged obliquely to the front-rear direction of the vehicle (see FIG. 2), the bush 10 is arranged so that the front-rear direction of the vehicle passes through the convex portion 11a, and the direction of the two convex portions 11a and 11a (see FIG. 3), which is substantially the direction in the middle between the solid direction P1 and the bore direction P2 (the direction of approximately 45° angle), is directed to the front-rear direction of the vehicle, that is, the horizontal direction (see FIG. 5). As a result, in the bush 10 of the present embodiment, the positions of the bores 14 provided in the rubber portion 13 are unequally arranged with respect to the front-rear direction of the vehicle, and the two convex portions 11a and 11a are in the front-rear direction of the vehicle.

When the two convex portions 11a and 11a are in the front-rear direction of the vehicle, the durability of the rubber portion 13 does not deteriorate. The reason is as follows. For example, in the case where the rubber portion 13, which is softer than the portion in the solid direction P1 and is provided with the bore 14, has an input of force in the front-rear direction of the vehicle that is same to the input of force in the solid direction P1, the movement amount of the inner cylinder 11 and the outer cylinder 12 increases. Once the movement amount increases, the pulling amount of the rubber portion 13 increases, and the durability deteriorates. In the present embodiment, however, the two convex portions 11a and 11a serve as stoppers to suppress the deformation even when a force that is same to the force in the solid direction P1 is input in the front-rear direction of the vehicle, thereby preventing the movement amount of the inner cylinder 11 and the outer cylinder 12 from increasing.

As described above, according to the bush of the present disclosure and the bush arrangement structure of the present disclosure, the bush 10 of the present embodiment is arranged in the bush arrangement structure of the present embodiment so that the front-rear direction of a vehicle passes through the two convex portions 11a and 11a. In this way, even if the front-rear direction of the vehicle is arranged closer to the bore direction P2 in the bush 10 of the present embodiment, the spring property ratio (rigidity ratio) between the solid direction P1 and the bore direction P2 is maintained, the tensile strength in the front-rear direction of the vehicle is increased, the displacement amount caused by the input of force in the front-rear direction of the vehicle can be suppressed, the durability can be improved, and the softness in the bore direction P2 can be maintained.

As a result, with the bush 10 of the present embodiment arranged in the bush arrangement structure of the present embodiment, the spring property (rigidity) in the front-rear direction of the vehicle is softened to improve the ride quality, and it is possible to achieve both softness and durability. That is, according to the bush arrangement structure of the present embodiment, it is possible to maintain a predetermined spring property ratio between the direction of a portion other than a low-rigidity portion (solid direction P1 in the present embodiment) and the direction of the low-rigidity portion (bore direction P2 in the present embodiment) while maintaining the durability in the front-rear direction of a vehicle, in the state where the bush axis is arranged obliquely to the front-rear direction of the vehicle.

REFERENCE SIGNS LIST 10 bush
11 inner cylinder
11a convex portion
11b axial space
12 outer cylinder
13 rubber portion
14 bore
14a slit-shaped portion
14b hole portion
15a trailing arm
15b torsion beam
15c attaching member
a bush axis
P1 solid direction
P2 bore direction

The invention claimed is:

1. A bush comprising an inner cylinder, an outer cylinder arranged radially outside the inner cylinder, and an elastic body connecting the inner cylinder and the outer cylinder, wherein
the elastic body is provided with a low-rigidity portion that extends a predetermined length in a circumferential direction and lowers rigidity in a radial direction, a convex portion that is formed of a metal member or a resin member and projects from the inner cylinder to the outer cylinder is provided at a circumferential position corresponding to the low-rigidity portion of the elastic body, and a circumferential center of the convex portion is arranged to be shifted to one side in the circumferential direction with respect to a circumferential center of the low-rigidity portion.

2. The bush according to claim 1, wherein the low-rigidity portion is a bore formed by penetrating the elastic body in a bush axial direction.

3. The bush according to claim 1, wherein the low-rigidity portion is formed over a range having a central angle of 90° or more in the circumferential direction.

4. A bush arrangement structure, wherein the bush according to claim 1 is arranged so that a front-rear direction of a vehicle passes through the convex portion.

5. The bush according to claim 2, wherein the low-rigidity portion is formed over a range having a central angle of 90° or more in the circumferential direction.

6. A bush arrangement structure, wherein the bush according to claim 2 is arranged so that a front-rear direction of a vehicle passes through the convex portion.

7. A bush arrangement structure, wherein the bush according to claim 3 is arranged so that a front-rear direction of a vehicle passes through the convex portion.

8. A bush arrangement structure, wherein the bush according to claim 5 is arranged so that a front-rear direction of a vehicle passes through the convex portion.

9. The bush according to claim 1, wherein the elastic body is in the form of a rubber portion.

10. The bush according to claim 2, wherein the elastic body is in the form of a rubber portion.

11. The bush according to claim 2, wherein the bore has a slit-shaped portion extending in an arc shape along the circumferential direction and hole portion at both ends in the circumferential direction, the convex portion is arranged on the radially inner side of the slit-shaped portion, and only the elastic body with no convex portion is arranged on the radially inner side of the slit-shaped portion of the bore and arranged adjacent to the convex portion on only one side in the circumferential direction.

12. The bush according to claim 10, wherein the bore has a slit-shaped portion extending in an arc shape along the circumferential direction and hole portion at both ends in the circumferential direction, the convex portion is arranged on the radially inner side of the slit-shaped portion, and only the elastic body with no convex portion is arranged on the radially inner side of the slit-shaped portion of the bore and arranged adjacent to the convex portion on only one side in the circumferential direction.

* * * * *